United States Patent [19]
Jameson

[11] 3,922,997
[45] Dec. 2, 1975

[54] MARINE POWER TRANSMISSION SYSTEM

[75] Inventor: James J. Jameson, Coffeyville, Kans.

[73] Assignee: Gardner-Denver Company, Dallas, Tex.

[22] Filed: Apr. 17, 1974

[21] Appl. No.: 461,674

[52] U.S. Cl................ 115/37; 74/377; 74/665 GA; 115/34 R; 192/109 F
[51] Int. Cl.² .................... B63H 5/08; F16H 37/06
[58] Field of Search ....... 115/34, 35, 37; 192/87.15, 192/87.18, 87.19, 104 F, 109 F; 74/665 F, 74/665 G, 665 GE, 665 GA, 665 GB, 665 GC, 74/DIG. 8, 377; 180/6.2

[56] References Cited
UNITED STATES PATENTS

| | | | |
|---|---|---|---|
| 2,975,851 | 3/1961 | Youmans et al. | 180/6.2 |
| 3,112,728 | 12/1963 | Krause | 115/37 |
| 3,289,628 | 12/1966 | Sable | 115/37 |
| 3,422,790 | 1/1969 | Connell | 115/37 |
| 3,424,029 | 1/1969 | Horsch et al. | 74/665 F |
| 3,457,805 | 7/1969 | Hagen | 74/665 GA |
| 3,515,014 | 6/1970 | Hagen | 74/665 GA |
| 3,653,476 | 4/1972 | Allen et al. | 192/87.19 |
| 3,823,801 | 7/1974 | Arnold | 192/109 F |

Primary Examiner—George E. A. Halvosa
Assistant Examiner—Charles E. Frankfort
Attorney, Agent, or Firm—Michael E. Martin

[57] ABSTRACT

A power transmission having an input shaft for connection to a single main propulsion engine, a pair of parallel output shafts and a pair of fluid actuated friction clutches disposed on each output shaft for selectively engaging gear sets to drive the output shafts in the same or opposite directions of rotation independently or simultaneously. A hydraulic control circuit including a manually operated control unit is used in connection with the transmission in a boat having two parallel propeller shafts whereby the clutches can be engaged and disengaged to provide forward and rearward propulsion of the boat as well as steering ofo the boat when underway.

15 Claims, 12 Drawing Figures

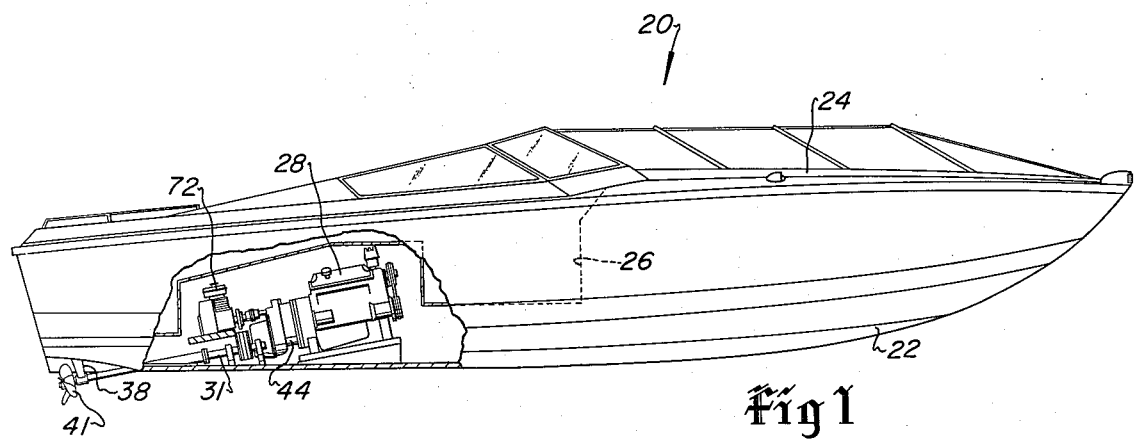
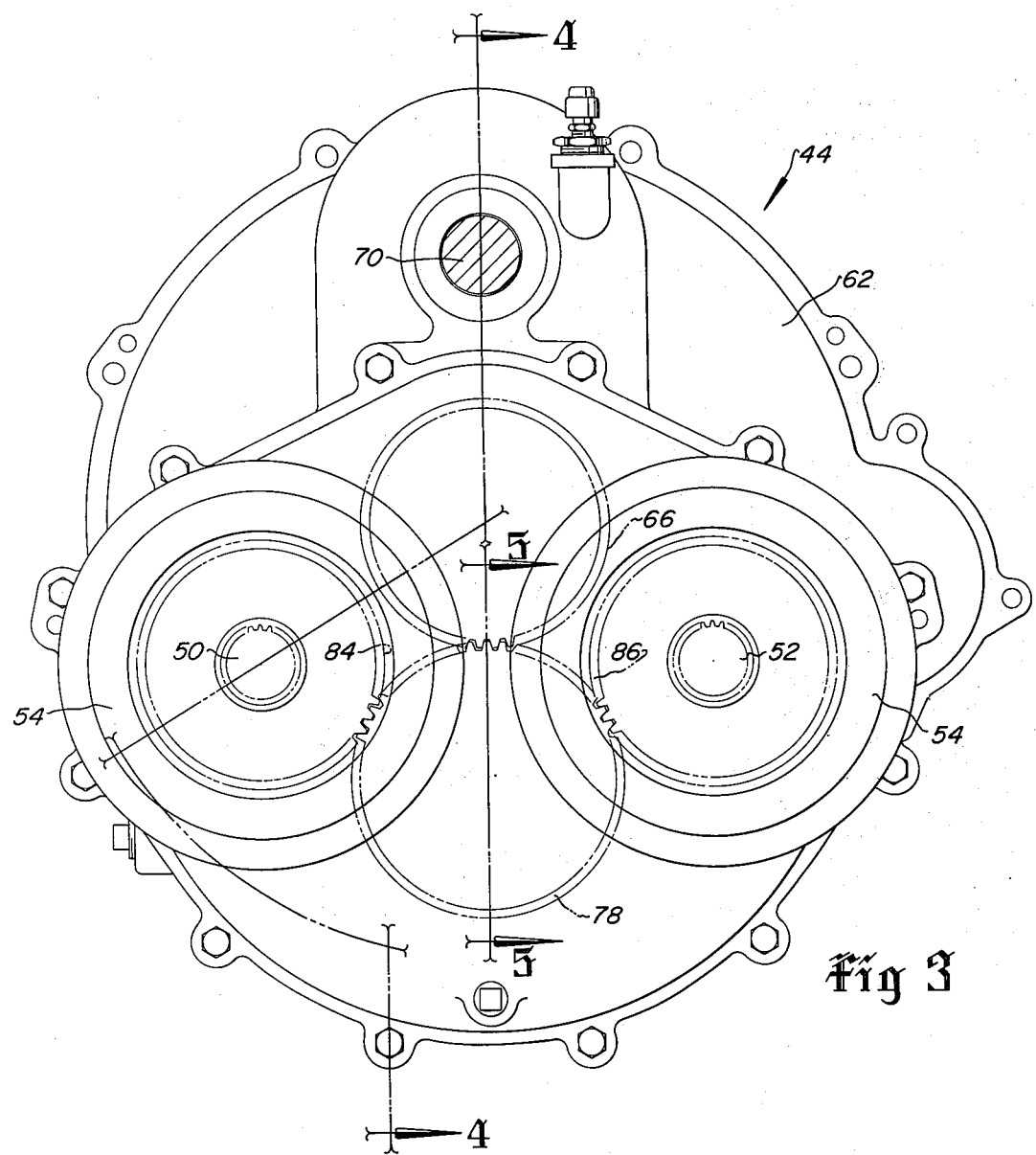

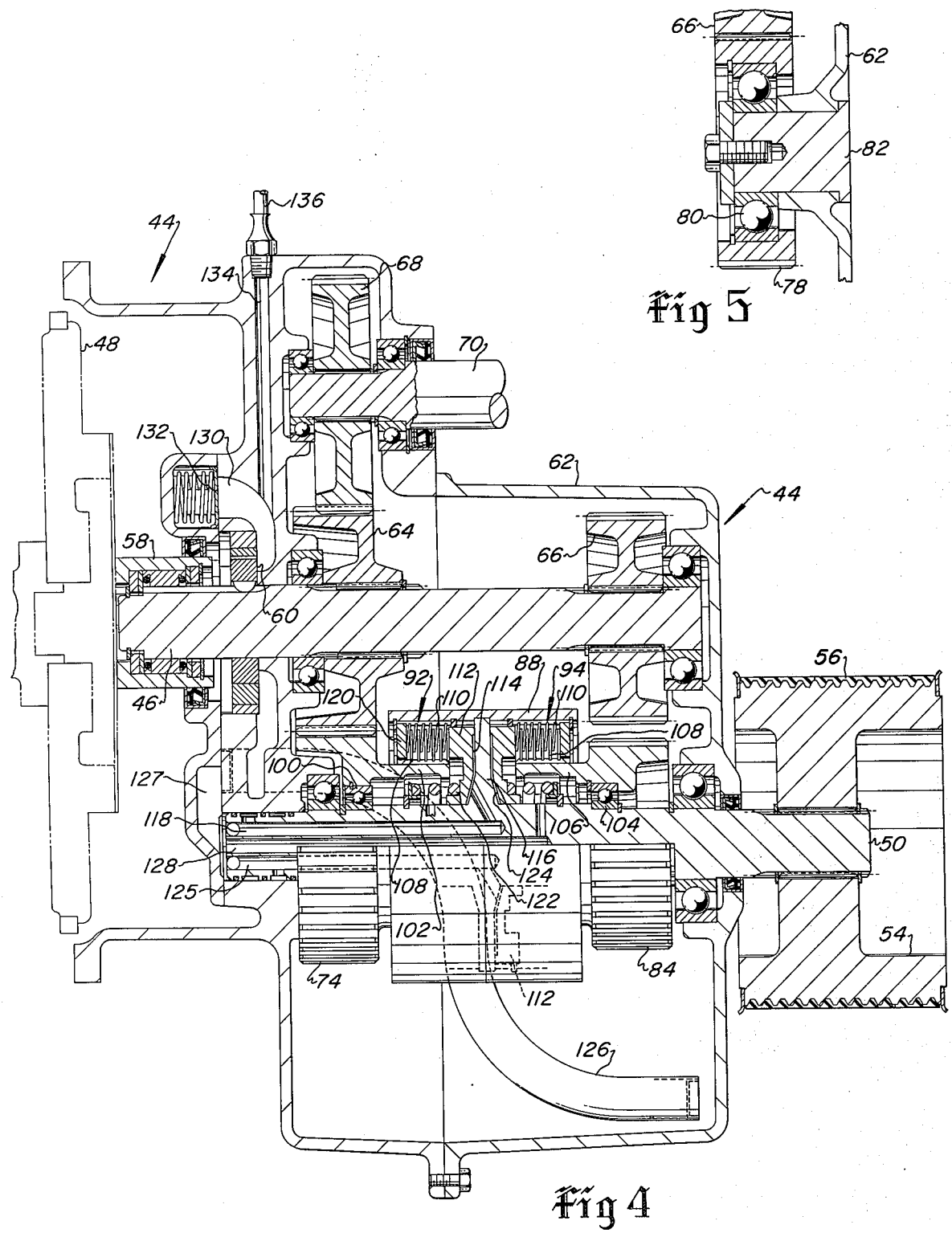

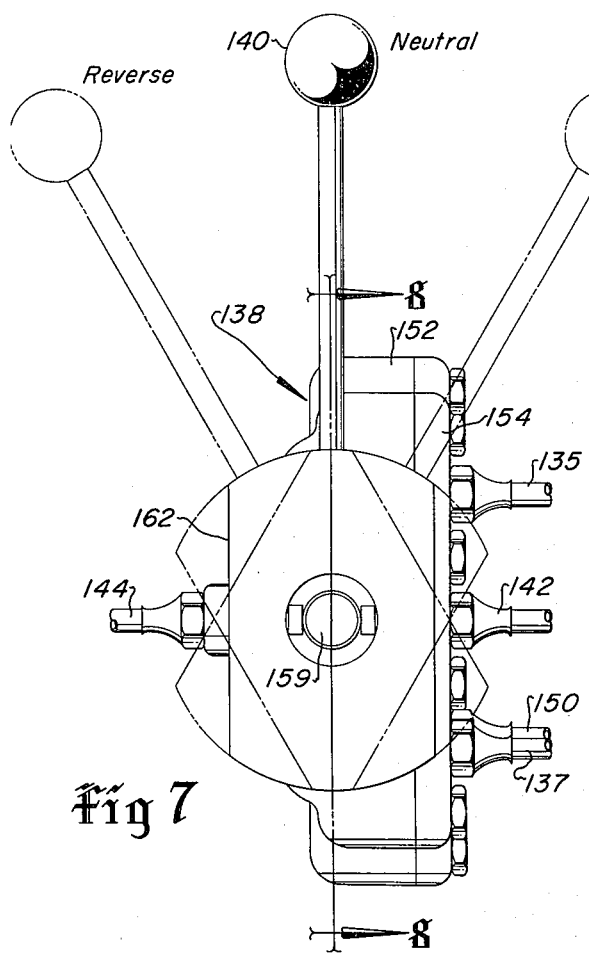
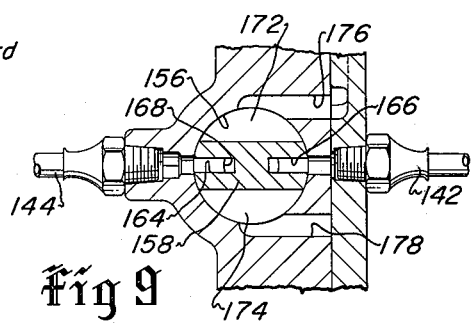
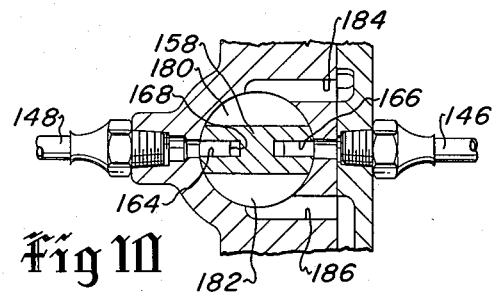
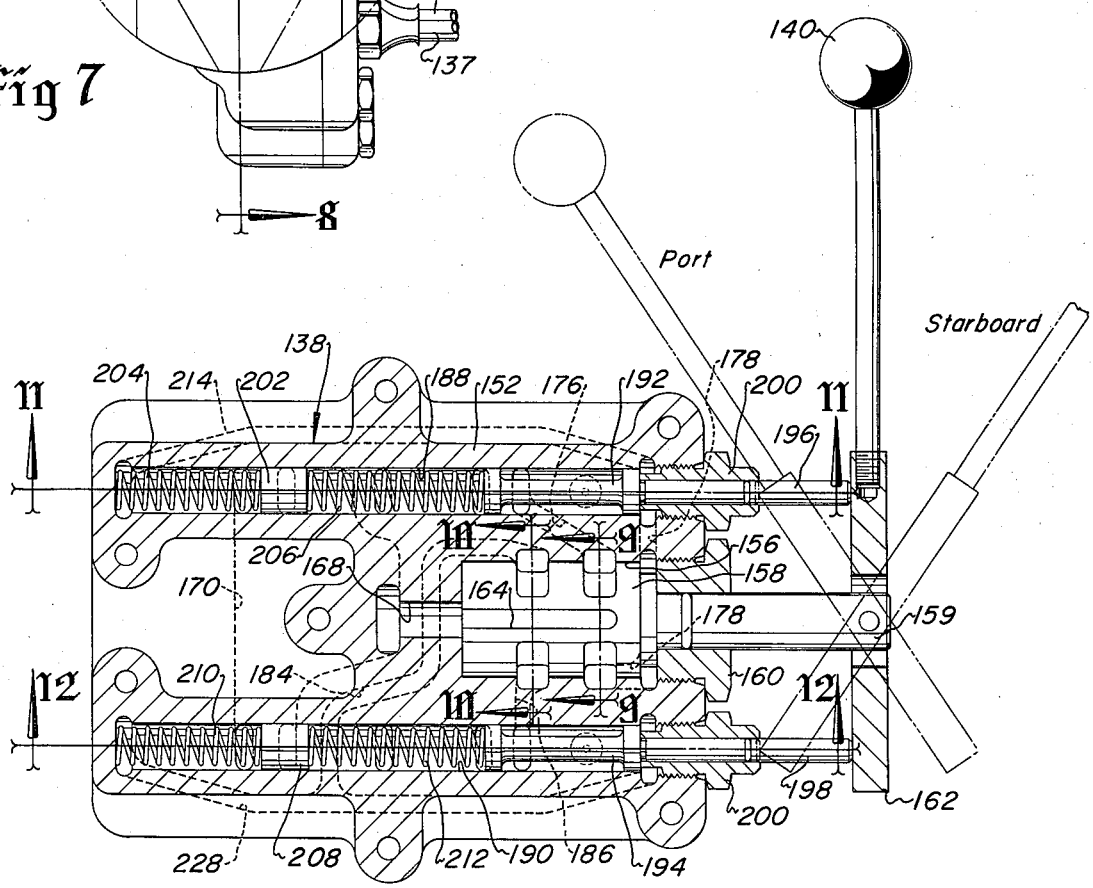

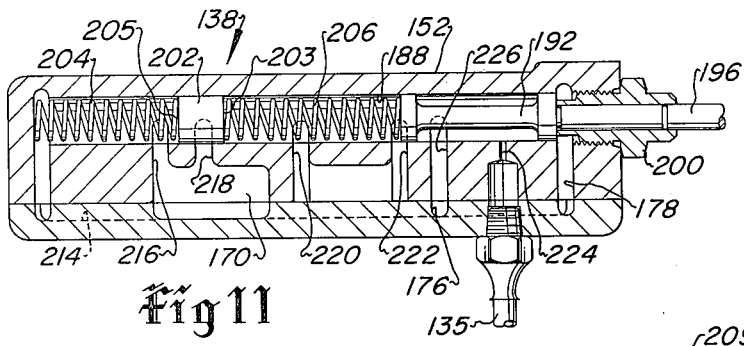
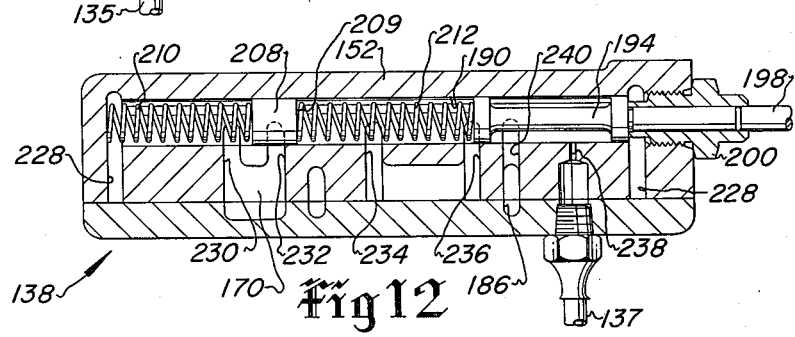
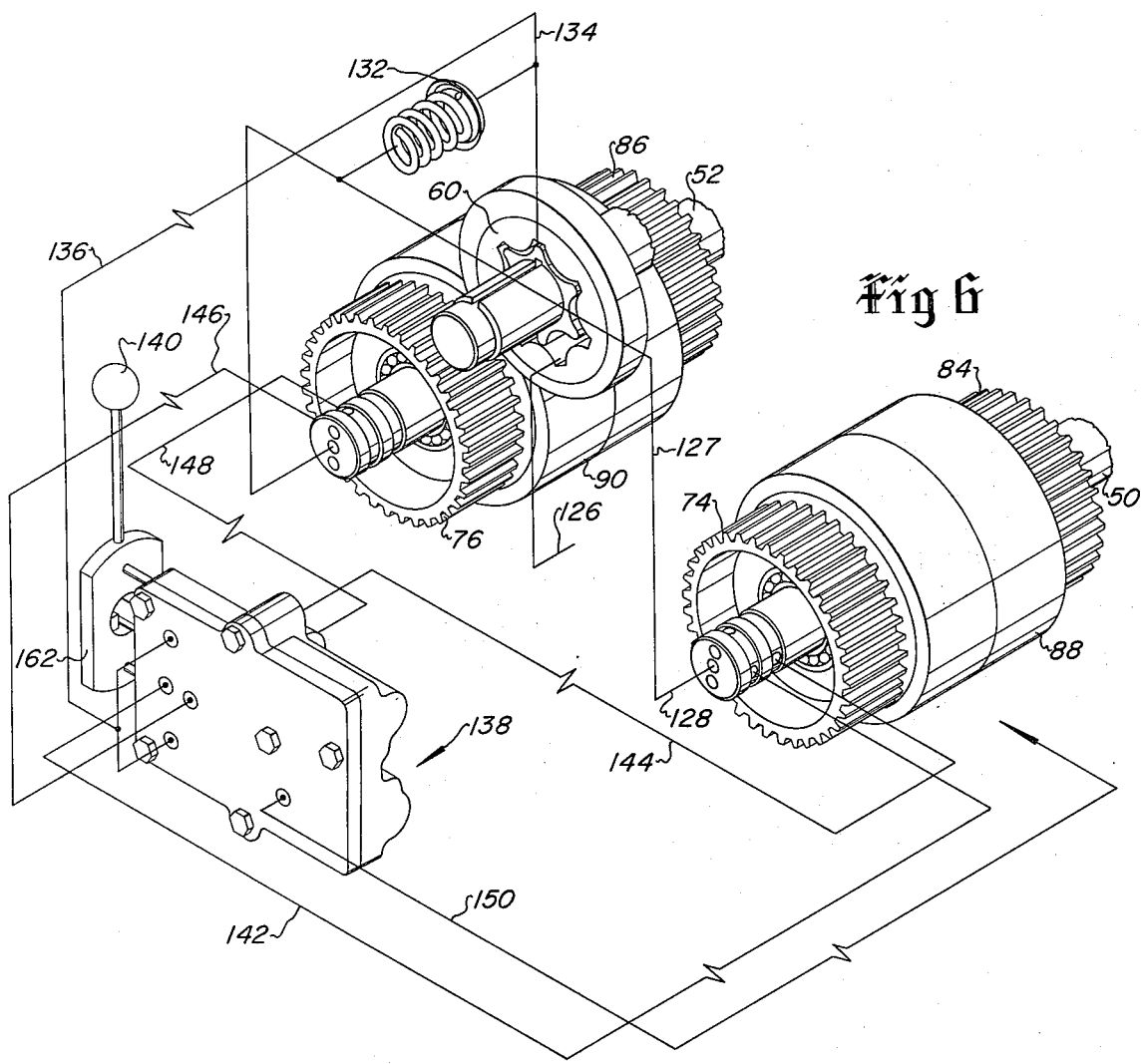

MARINE POWER TRANSMISSION SYSTEM

BACKGROUND OF THE INVENTION

Marine propulsion systems having dual propellers separately connected to independent propeller shafts are well known and hold certain advantages over single propeller arrangements. For example, dual propeller or so-called twin screw arrangements provide for greater maneuverability of the boat by using propeller speed and direction of propeller rotation to enhance turning. Twin screw arrangements also provide for greater reliability.

The disadvantages of the extra cost of a second engine and transmission, the weight and space required in the hull, and the problem of synchronizing propeller and engine speeds has resulted in several arrangements of twin screw marine propulsion apparatus using a single main propulsion engine driving the two propeller shafts through a power transmission unit. U.S. Pat. Nos. 3,113,549 and 3,289,628 are exemplary of prior efforts to provide twin screw marine propulsion systems using a single engine. It has been determined that it is desirable to provide for greater steerability of a boat by using changes in propeller speed as well as changes in direction of rotation of the respective propellers of a twin screw installation. Steering at moderate or high speed can be accomplished by developing a difference in propeller speed between the two propellers. In this way changes in course or correction for wind and water current action against the boat can be developed without changing rudder position or at least requiring only slight change in rudder position. Increased drag and wake turbulence caused by extreme changes in rudder position can thereby be avoided, and superior handling qualities provided for boats so equipped. Moreover, it has further been determined that a reliable and uncomplicated power transmission system for controlling, independently, the direction of rotation and the speed of the respective propellers of a twin screw vessel is highly desirable as compared to alternate arrangements such as variable pitch propellers or spearate prime movers driving each propeller.

SUMMARY OF THE INVENTION

The present invention provides a power transmission system for boats having dual propellers or so-called twin screw installations wherein both propellers may be driven by a single main propulsion engine and whereby the speed and direction of rotation of the respective propellers can be controlled to provide steering and improved maneuverability of the boat. It is contemplated that in certain installations of a marine power transmission system in accordance with the present invention that, depending on hull configuration and spacing of the respective propeller shafts, conventional rudders can be eliminated.

The present invention also provides a power transmission unit for a twin screw marine installation which may be coupled directly to a single main propulsion engine and includes dual output shafts driving the respective propeller shafts in the same or opposite direction of rotation and at the same or different speeds, respectively.

The present invention additionally provides a power transmission unit together with a control system for a twin screw marine vessel whereby the pilot may operate a single control lever to control forward and reverse movement of the vessel as well as steering thereof at low speed for docking and at moderate or high speed for course change or maintenance.

In accordance with the present invention there is provided a power transmission having a single input shaft, plural gear sets, and fluid actuated clutches for engaging and disengaging the respective gear sets to drive twin output shafts connected to independent propellers in a twin screw boat. The transmission unit is adapted to be controlled by a hydraulic control circuit which includes a single control lever for operating the transmission to change the speed and direction of rotation of the respective output shafts with or without changing engine speed.

The power transmission unit of the present invention is also adapted to have a second input shaft for coupling to an auxiliary engine whereby power can be transmitted to one or both propellers if the main propulsion engine is disabled or otherwise shut down and without requiring the main propulsion engine to be disconnected from the main transmission input shaft.

BRIEF DESCRIPTION OF THE DRAWINGS

FIG. 1 is a side elevation of a boat including the marine power transmission system of the present invention;

FIG. 3 is a view taken from line 3—3 of FIG. 2;

FIG. 4 is a section view taken along line 4—4 of FIG. 3;

FIG. 5 is a fragmentary section view taken from line 5—5 of FIG. 3;

FIG. 6 is a schematic of the hydraulic control circuit for the power transmission system of the present invention;

FIG. 7 is a transverse end view of the transmission hydraulic control unit;

FIG. 8 is a section view taken along line 8—8 of FIG. 7;

FIG. 9 is a section view taken along line 9—9 of FIG. 8;

FIG. 10 is a section view taken along line 10—10 of FIG. 8;

FIG. 11 is a section view taken along line 11—11 of FIG. 8; 25 and,

FIG. 12 is a section view taken along line 12—12 of FIG. 8.

DESCRIPTION OF THE PREFERRED EMBODIMENT

Figure 2:
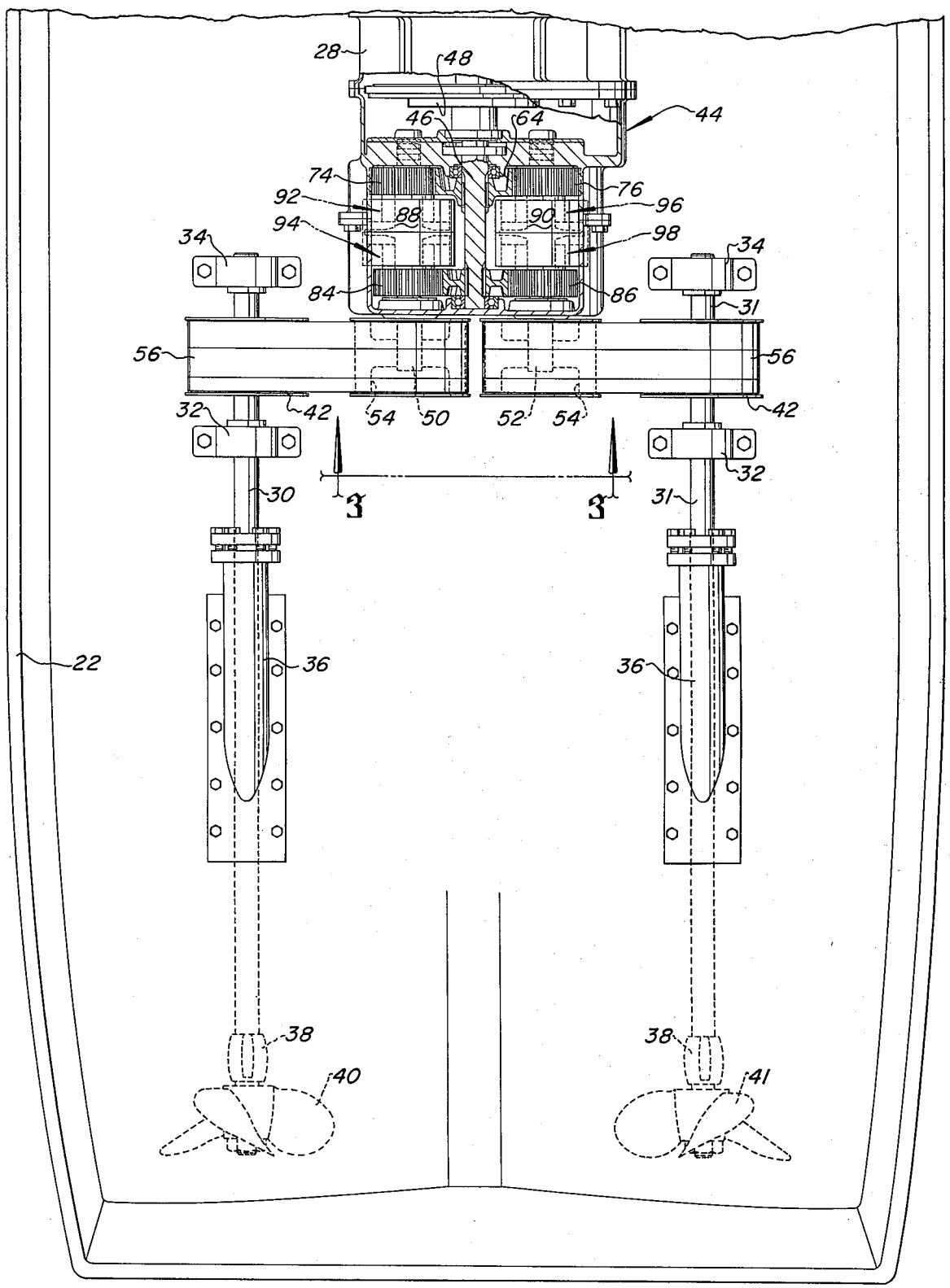
FIG. 2 is a plan view of a portion of the boat of FIG. 1 showing the general arrangement of the power transmission and propeller shafts.

Referring to FIGS. 1 and 2 the marine power transmission system of the present invention is disclosed in combination with a boat 20 of the relatively light displacement planing type. Although the transmission system of the present invention is particularly advantageous for relatively light displacement craft, it will be appreciated that virtually all vessels employing twin screw arrangements could utilize the teachings of the present invention. The boat 20 includes a single hull 22, a forward deck 24, and an operator control station or cockpit 26. In FIG. 1 a portion of the hull 22 is broken away to show a single main propulsion engine 28 disposed inboard generally in a conventional manner below decks and along the longitudinal centerline of the hull. The engine 28 is an internal combustion type but a variety of prime movers could be substituted therefor to provide the power to drive the input shaft of the herein described transmission unit.

The boat 20 includes a pair of propeller shafts 30 and 31 mounted in the hull 22 and spaced apart on opposite sides of the centerline of the hull. The shafts 30 and 31 are rotatably mounted in suitable bearings 32 and 34 supported in the hull 22. The shafts 30 and 31 also extend aft through conventional stuffing boxes 36 to the exterior of the hull 22 and are partially supported by struts 38. Propellers 40 and 41 are respectively secured to the shafts 30 and 31 in a conventional manner. The propellers 40 and 41 are preferably of the opposite "hand" and the shafts 30 and 31 are driven in opposite directions of rotation when both propellers are propelling in the same direction. Each propeller shaft also includes a sheave 42 drivably mounted thereon and disposed between the bearings 32 and 34.

Referring to FIGS. 2 and 3 the transmission system of the present invention includes a transmission unit, generally designated by the numeral 44, which is mounted on the engine 28. The transmission unit 44 includes a rotatable input shaft 46 connected by way of a suitable coupling 48 to the output shaft of the engine 28. The transmission unit 44 also includes two parallel output shafts 50 and 52 each of which has a sheave 54 mounted thereon and secured for rotation therewith. The shaft 50 is drivably connected to the shaft 30 and propeller 40 by way of a flexible endless belt 56 trained around sheaves 42 and 54. Output shaft 52 is similarly drivingly connected to the shaft 31 and propeller 41 as shown in FIG. 2. The shafts 30 and 31 are spaced farther apart with respect to the centerline of the hull 22 than the transmission output shafts 50 and 52 to enhance steering of the boat 20 by means of propeller speed change and change in direction of propeller rotation. The propeller shafts could be coupled directly to the respective transmission shafts 50 and 52 or other intermediate transmission means including additional gearing or chain drives could be used in place of the flexible belt and sheave arrangement shown in the drawings.

The transmission unit 44 is of a type which is characterized by two gear sets and a plurality of pressure fluid actuated multiple disc friction clutches selectively engageable for driving the two output shafts 50 and 52. The transmission unit 44 may be operated to drive the output shafts 50 and 52 independently or simultaneously in opposite directions of rotation as will be apparent from the detailed description herein. Referring to FIGS. 2, 4 and 5, the transmission unit input shaft 46 is rotatably mounted in suitable bearings disposed in a housing 62 and is drivenly connected to the engine 28 by the coupling 48 which includes a suitable one way or overrunning clutch 58. A suitable oil pump 60 of the internal gear type is also mounted in the transmission housing 62 and keyed to the input shaft 46 in a known way. The input shaft 46 includes first and second input gears 64 and 66 mounted thereon for driving engagement therewith. The gear 64 is in mesh with a gear 68 mounted on an auxiliary input shaft 70. The shaft 70 is connected to an auxiliary or emergency drive unit comprising an engine and clutch assembly shown in FIG. 1 and generally designated by the numeral 72.

In the event that the main propulsion engine 28 should become inoperative, power to the input shaft 46 of the transmission unit could be provided by the engine 72 to enable the boat 20 return to a safe harbor.

The gear 64 is also constantly meshed with gears 74 and 76 mounted on the respective shafts 50 and 52. The gears 74 and 76 are rotatable with respect to the shafts 50 and 52 and are connected to fluid actuated clutch means, to be described herein, for driving the respective shafts. Referring to FIG. 5 the input gear 66 is constantly in mesh with an idler gear 78 rotatably mounted on a bearing 80 which in turn is suitably supported in the housing 62 on a stub shaft 82. The idler gear 78 is in constant mesh with gears 84 and 86 which are rotatably mounted on the respective shafts 50 and 52 and are operable to drive the shafts through clutch means also. Due to the arrangement of the gear 66 driving the gears 84 and 86 by way of the idler gear 78 the gears 74 and 84 are always driven in opposite directions with respect to each other. The gears 76 and 86 are likewise always rotated in the opposite direction with respect to each other.

The output shafts 50 and 52 are substantially identical in construction and respectively include cylindrical clutch drums 88 and 90 fixed thereto. Multiple disk fluid actuated clutch assemblies generally designated by the numerals 92 and 94 are selectively operable to engage the respective gears 74 and 84 to drive the output shaft 50 in opposite directions of rotation. Similarly, clutches 96 and 98 are selectively operable for engaging the gear 76 or gear 86 with the output shaft 52. The clutches 92, 94, 96 and 98 are substantially identical in their structural features and operating characteristics. In the interest of conciseness only the clutches 92 and 94 will be described in some detail.

Referring to FIG. 4, which shows the clutches 92 and 94 of the port side output shaft 50 in section, the gear 74 is suitably mounted on a bearing 100 and includes a cantilever hub 102. The gear 84 is also mounted on the shaft 50 on a bearing 104 and includes a hub 106. The clutch 92 comprises a plurality of interleaved friction disks 108 and 110 which are respectively secured for rotation with the hub 102 and the drum 88. An annular piston 112 is slidably mounted on the shaft 50 and is operable to forcibly engage the disks 108 and 110 to form a driving connection between the gear 74 and shaft 50 in response to the admission of pressure fluid to a chamber 114 formed between the piston and the radial hub 116 of the drum 88. Pressure fluid is admitted to the chamber 114 through a passage 118 in the shaft 50. The drum 88 includes a retainer plate 120 keyed thereto. A coil spring 122 is retained on the shaft 50 and is operable to bias the piston 112 toward the hub 116 to disengage the clutch 92.

The clutch 94 is similarly constructed and also includes a plurality of interleaved friction disks 108 and 110 and a piston 112. Pressure fluid is supplied to a chamber 124 through a passage 125 in the shaft 50. Accordingly, in response to supplying pressure fluid to chamber 124 the piston 112 is moved to effect engagement of the clutch 94 for drivingly connecting the gear 84 to shaft 50. The clutches 92 and 94 are supplied with cooling and lubricating oil by way of a sump formed in the housing 62, a conduit 126 leading to the pump 60, suitable discharge passages formed in the housing 62 and in communication with the pump 60 and leading to a passage 128, and a corresponding passage, not shown, formed in the shaft 52. The clutches 92 and 94 are of a type basically well known. As previously mentioned the clutches 96 and 98 are similarly constructed and operate in the same manner for drivingly engaging the respective gears 76 and 86 with the shaft 52.

In accordance with the present invention the clutches above described may be selectively engaged to provide forward and reverse propelling by the respective propellers 40 and 41. Moreover, the clutches may also be operated to provide controlled slippage to vary the relative speed of the respective propellers for improved steering and maneuvering of the boat 20. By controlling the fluid pressure acting on the pistons of the respective clutches a controlled slippage of the interleaved disks can be attained to vary the relative speed between the gear 74 or 84 and the output shaft 50, and between the gear 76 or 86 and the output shaft 52. This selective control of clutch engagement is provided by a hydraulic control circuit and operator control unit in accordance with the present invention and described herein. For purposes of this discussion it will be assumed that the input shaft 46 is rotated clockwise by the engine 28 as viewed standing astern of the boat and facing the stern. For forward propulsion of both propeller shafts clutches 92 and 98 are engaged to provide clockwise rotation of output shaft 52 and propeller shaft 31 and anticlockwise rotation of output shaft 50 and the propeller shaft 30. Accordingly, propellers 40 and 41 are of the left and right-hand respectively and operate in so-called "outboard" rotation when driving forward. This rotation of the respective propellers causes reaction forces on the propellers and the hull which provide for good steering characteristics. Moreover, for reverse propulsion from both propellers the clutches 94 and 96 are engaged for driving their respective shafts 50 and 52. Since clutches 92 and 94 rotate shaft 50 in opposite directions, they are not normally both totally or partially engaged at the same time. Clutches 96 and 98 likewise are not engaged at the same time for driving shaft 52.

The hydraulic control circuit and operator control unit of the present invention is disclosed in FIGS. 6 through 12. Referring to FIGS. 4 and 6, the control circuit illustrated utilizes pressure fluid in the form of transmission lubricating and cooling oil discharged from the pump 60 by way of a passage 130. The lubrucation circuit includes a passage 127 which conducts oil to passage 128 and a similar passage formed in the shaft 52. The transmission unit 44 includes a pressure limiting valve 132 which maintains a predetermined pressure in the control circuit and discharges oil into the lubrication circuit including the passage 128. Passage 134 and a suitable conduit 136 supply pressure fluid to an operator control unit generally designated by numeral 138. The control unit 138 is desirably located at the pilot control station 26. The control unit 138, which is disclosed in further detail herein, includes a control lever 140 which is operable to actuate a plurality of valve members for controlling the admission of pressure fluid to actuate the clutches 92 and 94 of the port side output shaft 50 and the clutches 96 and 98 of the starboard side output shaft 52. Pressure fluid is supplied to the piston chambers of the clutches 92 and 94 from the control unit 138 by way of conduits 142 and 144, respectively. Conduits 146 and 148 are in communication respectively with the corresponding actuating pistons of the clutches 96 and 98 which drivingly engage the input shaft 46 with the output shaft 52. A conduit 150 is also connected to passage means in the control unit 138 for draining pressure fluid to the housing 62.

Referring to FIGS. 7 and 8 the control unit 138 includes a housing 152 to which is removably fastened a cover plate 154. The housing 152 includes a chamber 156 in which is disposed a closely fitted but rotatable cylindrical plug 158 forming a valve closure member. The plug 158 includes a stem 159 extending through a suitable bore in a retainer cap 160 which is threaded into the housing 152. A cam plate 162 is mounted on the end of the stem 159 and is adapted for lateral pivoting movement from side to side as shown in FIG. 8. The control lever 140 is threadedly connected to the cam plate 162. Referring to FIGS. 9 and 10 also, the plug 158 includes a pair of longitudinal grooves 164 and 166 which in the position of the plug shown places the conduits 142, 144, 146 and 148 in communication with a passage 168. The passage 168 is in turn in registration with a chamber 170 formed in the housing 152. The chamber 170 is in communication with the conduit 150 leading to the fluid reservoir or sump in the transmission unit 44. The plug 158, as shown in FIG. 9, includes notches 172 and 174 which are formed to place passages 176 and 178 in communication respectively with conduits 142 and 144 when the plug is rotated clockwise (viewing FIG. 9). As shown in FIG. 10 the plug 158 also includes similar notches 180 and 182 which place passages 184 and 186 in communication respectively with conduits 146 and 148 also in response to clockwise rotation of the plug (viewing any of FIGS. 7, 9 or 10).

Accordingly, in response to rotation of the plug 158 opposite to that above described, passages 176 and 178 communicate respectively with conduits 144 and 142 and passages 184 and 186 are respectively in communication with conduits 148 and 146.

The housing 152 also includes elongated bores 188 and 190 in which are disposed, respectively, pressure control valve means comprising spool valve members 192 and 194. The members 192 and 194 have integral actuating rods 196 and 198 which extend through closure plugs 200 and are engageable with the cam plate 162. A cylindrical closure member comprising valve spool 202 is disposed in bore 188 and is interposed between compression springs 204 and 206. A similar valve spool 208 is interposed between springs 210 and 212 disposed in bore 190. The bores 188 and 190 include a series of ports opening thereinto as shown in FIGS. 11 and 12. Referring to FIGS. 8 and 11, the opposite ends of the bore 188 are in communication with each other by way of passages 214 and 178. Ports 216 and 218 open into chamber 170. Additional ports 220 and 222 communicate with each other and the bore 188. The pressure fluid supply conduit 136, shown in FIG. 6, is divided into branch conduits 135 and 137, the former being connected to an opening 224 for supplying pressure fluid to a port 226 and the associated passage 176 in the position of the spool 192 shown in FIG. 11.

Referring to FIGS. 8 and 12 the opposite ends of the bore 190 are also in communication with each other by way of a passage 228 which is also connected to the passage 184. Ports 230 and 232 open into the chamber 170 and transfer ports 234 and 236 are provided which are similar to the ports 220 and 222. Conduit 137 opens into the bore 190 through the opening 238 and provides pressure fluid to passage 186 by way of port 240 when the spool 194 is in the position shown in FIG. 12.

The operation of the control unit 138 to control the relative speed and direction of rotation of the output shafts 50 and 52 will now be described. It will be understood that the engine 28 may be separately controlled to drive the input shaft 46 at variable speed as desired. Conversely, the engine 28 could be provided with suitable speed control mechanism connected to the lever 140 so that, for example, as the lever is rotated from the neutral position indicated in FIG. 7 to either the extreme forward or reverse positions indicated, the engine speed would be progressively increased. Such an arrangement would therefore provide total control of the speed and the directional attitude of the boat 20 by means of the single operating lever 140. Such an interconnection of the engine throttle mechanism with the lever 140 is considered to be well known in the art of marine engine controls.

When the lever 140 is in the neutral position conduits 142, 144, 146, and 148 are all in communication with the low pressure or drain chamber 170 and accordingly the clutches 92, 94, 96, and 98 are all disengaged. Assuming that the engine is being controlled to provide a suitable input speed to the input shaft 46, when the lever 140 is rotated to the forward position fluid at regulated pressure from pump 60 is conducted through passages 176 and 186 to conduits 142 and 148 by way of the respective notches 172 and 182 in the valve plug 158. Accordingly, fluid is supplied at pressure sufficient to fully engage clutches 92 and 98 and both shafts 50 and 52 are rotated at the same speed to propel the boat forwardly. Conduit 144 is in communication with the chamber 170 by way of notch 174, passages 178 and 214, and port 216. Conduit 146 is also in communication with chamber 170 by way of notch 180, passages 184 and 228, and port 230. Accordingly, clutches 94 and 96 remain disengaged as no pressure fluid is supplied to their respective piston actuators.

If it is desired to turn the boat to port or to the left, while underway forward, the lever 140 may be pivoted progressively to the left whereupon the cam plate 162 engages stem 196 to move spool 192 toward the left, viewing FIGS. 8 and 11. As the spool 192 moves to the left, springs 204 and 206 are compressed somewhat and spool 202 is moved to tend to uncover port 218. Port 222 is also opened and placed in communication with the fluid supply passage 176 and fluid is thereby communicated to port 220 to act on face 203 of the spool 202. Accordingly, pressure fluid acting on the face 203 together with the force of spring 206 acting thereagainst tends to move the spool 202 to bleed fluid to chamber 170 thereby relieving the pressure in conduit 142 to begin to disengage the clutch 92. Therefore, as the lever 140 is progressively moved to the left, viewing FIGS. 8 and 11, fluid pressure in conduit 142 is controllably reduced and clutch 92 undergoes controlled slippage to reduce the speed of output shaft 50 and propeller 40. Since propeller 41 is now rotating faster than propeller 40 the boat will undergo a turning movement to the left or to port.

As the lever 140 is depressed further to the left, the spool 192 will pass over the opening 224 completely terminating communication of the conduit 135 with passage 176. Moreover, passage 176 will now be in full communication with ports 220, 222, and 218 as the spool 202 will be further displaced to the left, and the pressure acting to engage clutch 92 will be relieved to thereby completely disengage the clutch. With propeller 40 now completely without driving power a greater turning effort to the left will be imposed on the boat 20. If the lever 140 is even further depressed to the left, viewing FIGS. 8 and 11, spool 192 will now uncover opening 224 thereby communicating pressure fluid to passage 178, notch 174, and conduit 144 leading to the clutch 94. Pressure fluid also flows by way of passage 214 to act on face 205 of spool 202 tending to move the spool to the right to uncover port 216. Accordingly, the clutch 94 now becomes engaged and the propeller shaft 30 begins rotating in the reverse direction. With propellers 41 and 40 rotating in opposite directions, forward and reverse respectively, the boat will undergo a very sharp leftward turning movement which normally would be executed at relatively slow speed. The springs 204 and 206 and the spool 202 act to modulate the rate of pressure increase and decrease in the clutches 92 and 94 to provide for smooth engaging and disengaging or slippage action.

As will be readily understood to those skilled in the art, the valve spools 194 and 208 disposed in the bore 190 may be controlled in a similar way. Upon depressing the lever 140 progressively to the right, viewing FIG. 8, progressive slippage of clutch 98 to total disengagement and finally engagement of clutch 96 may be accomplished, all the while the clutch 92 being fully engaged. Such action will, of course, provide progressive turning effort of the boat to starboard. As the lever 140 is depressed to the right, viewing FIG. 8, the cam plate 162 will move spool 194 to the left to uncover port 236 whereby pressure fluid will be conducted through port 234 to act on face 209 of spool 208. Spool 208 will be biased to progressively uncover port 232 relieving the pressure of fluid in passage 186, notch 182, conduit 148 and clutch 98 to cause controlled slippage and reduced speed of the shaft 31 with respect to shaft 30. Further movement of the spool 194 to the left, viewing FIG. 12, will cause closure of the opening 238 thereby cutting off all flow of pressure fluid and placing the conduit 148 in communication with the chamber 170 by way of passage 186 and ports 232, 234, and 236. Accordingly, the clutch 98 will then become totally disengaged. Movement of the lever 140 to the right beyond the last mentioned position will place the opening 238 in communication with passages 228 and 184 to conduct pressure fluid at a controlled pressure to conduit 146 and clutch 96 thereby engaging said clutch to cause rotation of the propeller shaft 31 in the reverse direction. Under this operating condition the propeller 40 will be turning forwardly and the propeller 41 will be turning in the reverse direction which will cause a strong turning effort to the right to be imposed on the boat 20.

The control system and associated transmission unit disclosed herein is also operable to control the maneuvering or turning of the boat 20 when moving astern. If it is desired to move the boat astern or in reverse the lever 140 may be moved to the reverse position indicated in FIG. 7. Movement of the lever 140 to the reverse position will rotate the plug 158 to place the passage 176 in communication with conduit 144 by way of notch 172, and passage 186 will be in communication with conduit 156 by way of the notch 182. Pressure fluid will be conducted to the clutches 94 and 96 causing full engagement of same so that the output shafts 50 and 52 and their associated propeller shafts will be rotating in the reverse direction. Movement of the lever 140 to the left or right while in the reverse position will cause progressive disengagement of the clutches 94 or 96 in the same manner as described above for the respective forward drive clutches 92 and 98. Moreover, as the lever 140 is moved to the maximum left position clutch 94 will become totally disengaged and clutch 92 will be pressurized to engagement thereby effectuating forward rotation of propeller 40 while the propeller 41 is turning in reverse. A turning effort to the left, while moving astern, will be imposed on the boat under this condition.

Conversely, as the lever 140 is progressively moved to the right while in the reverse position the clutch 96 will be progressively disengaged and clutch 98 will sequentially become pressurized to engagement to cause rotation of the propeller 41 in the forward direction while the propeller 40 is turning reversely. A detailed explanation of the sequential movements of the spools 192 and 194 and the associated fluid flow conditions resulting therefrom is believed to be understandable to those skilled in the art from the above described condition changes which occur when the lever 140 is moved left or right while in the forward position. The operation of the control unit 138 is the same while the sequential change in operating condition of the respective clutches 92, 94, 96 and 98 is merely reversed.

As may be appreciated from the foregoing, the present invention provides an improved marine power trannsmission system whereby good maneuverability and ease of control of a boat having a single main propulsion engine may be attained. Moreover, total control of forward and reverse operation of the transmission unit 44 as well as operation of the transmission unit to maneuver a twin screw marine vessel may be accomplished with a single control lever.

What is claimed is:

1. In a power transmission system for a boat including a main propulsion engine, a pair of spaced apart propeller shafts, and a propeller mounted on each of said propeller shafts, a transmission unit comprising:
   a housing;
   an input shaft mounted on said housing, said input shaft including means for drivingly coupling said engine to said input shaft;
   first and second input gears connected to said input shaft to be driven thereby;
   idler gear means meshed with said second input gear;
   a pair of output shafts mounted on said housing and means drivingly connecting said output shafts to respective ones of said propeller shafts; and,
   a forward drive gear rotatably mounted on one of said output shafts and meshed with said first input gear, and a forward drive gear rotatably mounted on said other output shaft and meshed with said idler gear means; and,
   forward and reverse clutches associated with each of said output shafts for drivingly connecting said input shaft to said output shafts, said forward clutches being disposed for connecting said forward drive gears to said output shafts, respectively, said forward and reverse clutches being selectively fully engageable whereby said propeller shafts may be driven at the same speed, said forward and reverse clutches being operable at a controlled slip condition for changing the speed of one propeller shaft with respect to the other propeller shaft to effect turning movements of said boat.

2. The invention set forth in claim 1 wherein:
   said transmission unit includes a reverse drive gear rotatably mounted on said one output shaft and meshed with said idler gear means and a reverse drive gear rotatably mounted on said other output shaft and meshed with said first input gear, and said reverse clutches are disposed for connecting said reverse drive gears to said output shafts, respectively.

3. The invention set forth in claim 2 wherein:
   said forward and reverse clutches are multiple disk fluid actuated clutches.

4. In a power transmission system for a boat including a main propulsion engine, pair of spaced apart propeller shafts, and a propeller mounted on each of said propeller shafts, a transmission unit comprising:
   a housing;
   a first input shaft mounted on said housing and projecting from one side of said housinng, said first input shaft including means for drivingly coupling said engine to said first input shaft;
   first and second input gears connected to said input shaft to be driven thereby;
   idler gear means meshed with said second input gear;
   a pair of output shafts mounted on said housing in spaced apart and parallel relationship and projecting from a side of said housing opposite said one side;
   means drivingly connecting said output shafts to respective ones of said propeller shafts;
   a forward drive gear rotatably mounted on one of said output shafts and meshed with said first input gear, and a forward drive gear rotatably mounted on said other output shaft and meshed with said idler gear means;
   a reverse drive gear rotatably mounted on said one output shaft and meshed with said idler gear means, and a reverse drive gear rotatably mounted on said other output shaft and meshed with said first input gear; and,
   forward and reverse clutches associated with each of said output shafts and selectively engageable for drivingly connecting said input shaft to said output shafts by way of said forward and reverse drive gears respectively.

5. The invention set forth in claim 4 wherein:
   said transmission unit includes a second input shaft mounted on said housing and projecting from said side of said housing opposite said one side; and, gear means for drivingly connecting said second input shaft to said first input shaft.

6. The invention set forth in claim 5 wherein:
   said means for drivingly coupling said engine to said first input shaft includes one way clutch means.

7. A power transmission system for a boat comprising:
   a main propulsion engine disposed in said boat;
   a pair of spaced apart propeller shafts, and a propeller mounted on each of said propeller shafts;
   a power transmission unit including an input shaft drivenly connected to said engine, a pair of output shafts and means for drivingly connecting each of said output shafts to respective ones of said propeller shafts;
   pressure fluid actuated clutches associated with each of said output shafts for drivingly connecting said input shaft to said output shafts, said clutches being responsive to the actuating fluid pressure condition to be completely engaged and disengaged and to be operated at a controlled slip condition for reducing the speed of the associated output shaft with respect to the input shaft; and, control valve means for selectively controlling the pressure of said actuating fluid acting on each of said clutches whereby each of said clutches may be completely engaged and disengaged for driving the respective output shafts and associated propeller shafts simultaneously and independently, and whereby each of said clutches may be operated at a selectively controlled slip condition for reducing the speed of one of said propeller shafts with respect to the other to effect turning movements of said boat.

8. The invention set forth in claim 7 wherein:

said clutches for drivingly connecting said input shaft to said output shaft comprise forward and reverse clutches associated with each of said output shafts, said forward and reverse clutches being selectively engageable and disengageable to provide for driving the respective output shafts in forward and reverse directions simultaneously and independently.

9. The invention set forth in claim 8 wherein:

said forward and reverse clutches associated with each of said output shafts are multiple disk fluid actuated clutches responsive to the actuating fluid pressure condition to be completely engaged and disengaged and to be operated at a selectively controlled slip condition for reducing the speed of the associated output shaft with respect to the input shaft.

10. The invention set forth in claim 8 wherein:

said control valve means includes a single operating lever for actuating said control valve means to valve pressure fluid to said forward and reverse clutches to selectively effect full engagement of both of said forward clutches and both of said reverse clutches.

11. A power transmission system for a boat comprising:

a main propulsion engine disposed in said boat;

a pair of spaced apart propeller shafts, and a propeller mounted on each of said propeller shafts;

a power transmission unit including an input shaft drivenly connected to said engine, a pair of output shafts and means for drivingly connecting each of said output shafts to respective ones of said propeller shafts;

pressure fluid actuated forward and reverse clutches associated with each of said output shafts for drivingly connecting said input shaft to said output shafts, said clutches being responsive to the actuating fluid pressure condition to be selectively completely engaged and disengaged for driving the respective output shafts in forward and reverse directions simultaneously and independently and to be operated at a controlled slip condition for reducing the speed of the associated output shaft with respect to the input shaft; and, control valve means including a single operating lever for controlling the pressure of said actuating fluid acting on each of said clutches so that both of said forward clutches or both of said reverse clutches may be completely engaged to drive said output shafts and associated propeller shafts simultaneously and so that each of said clutches may be disengaged to effect driving of the respective output shafts independently, said control valve means including pressure control means operable in response to means selectively controlling the fluid pressure acting on said clutches movement of said operating lever for effect a selectively controlled slip condition of a forward or reverse clutch associated with one of said output shafts while the corresponding forward or reverse clutch associated with the other output shafts remains completely engaged.

12. The invention set forth in claim 11 wherein:

said control valve means comprises a control unit including a housing and a movable valve closure member disposed in said housing, said operating lever is movable laterally from side to side and to forward and reverse positions for moving said closure member to valve pressure fluid to both of said forward clutches and to both of said reverse clutches in response to movement of said operating lever to said forward and reverse positions, respectively.

13. The invention set forth in claim 12 wherein:

said pressure control means comprises respective pressure control valve means operable to reduce the fluid pressure acting on said respective forward and reverse clutches, said pressure control valve means including actuating members engageable with said operating lever and responsive to said lateral movement of said operating lever for causing said pressure control valve means to change the fluid pressure acting on said clutches.

14. The invention set forth in claim 13 wherein:

said pressure control valve means includes means responsive to progressive lateral movement of said operating lever for decreasing fluid pressure acting on one of said forward or reverse clutches connected to one of said propeller shafts to a pressure condition resulting in total disengagement of said clutch and said pressure control valve means is responsive to further lateral movement of said operating lever to valve pressure fluid to the actuating means of the other clutch connected to said one propeller shaft for engaging said other clutch to reverse the direction of rotation of said one propeller shaft.

15. The invention set forth in claim 14 wherein:

said pressure control valve means includes a pair of movable valve members disposed in said housing, and said actuating members are engageable with said valve members for moving one or the other of said valve members in response to lateral movement of said operating lever.

* * * * *